(12) United States Patent
Rust et al.

(10) Patent No.: US 11,186,011 B2
(45) Date of Patent: Nov. 30, 2021

(54) METHOD FOR PRODUCING THERMALLY CROSSLINKABLE POLYMERS IN A PLANETARY ROLLER EXTRUDER

(71) Applicant: Entex Rust & Mitschke GmbH, Bochum (DE)

(72) Inventors: Harald Rust, Bochum (DE); Klaus Massow, Hamburg (DE)

(73) Assignee: Entex Rust & Mitschke GmbH, Bochum (DE)

(*) Notice: Subject to any disclaimer, the term of this patent is extended or adjusted under 35 U.S.C. 154(b) by 225 days.

(21) Appl. No.: 16/487,928

(22) PCT Filed: Feb. 21, 2018

(86) PCT No.: PCT/EP2018/054308
§ 371 (c)(1),
(2) Date: Aug. 22, 2019

(87) PCT Pub. No.: WO2018/153935
PCT Pub. Date: Aug. 30, 2018

(65) Prior Publication Data
US 2020/0055214 A1     Feb. 20, 2020

(30) Foreign Application Priority Data

Feb. 24, 2017   (DE) .................. 10 2017 203 062.3

(51) Int. Cl.
*B29B 7/48*       (2006.01)
*B29C 48/35*      (2019.01)
(Continued)

(52) U.S. Cl.
CPC ............ *B29B 7/485* (2013.01); *B29C 35/041* (2013.01); *B29C 48/022* (2019.02);
(Continued)

(58) Field of Classification Search
CPC ......... B29B 7/485; B29B 7/488; B29B 7/487; B29B 7/847; B29B 7/60; B29B 7/826;
(Continued)

(56) References Cited

U.S. PATENT DOCUMENTS

| 4,331,718 A | 5/1982 | Gleichechagen et al. |
| 5,789,487 A | 8/1998 | Matyjaszewski et al. |

(Continued)

FOREIGN PATENT DOCUMENTS

| DE | 2845541 B1 | 6/1980 |
| DE | 19548136 A1 | 6/1997 |

(Continued)

*Primary Examiner* — Jeffrey M Wollschlager
(74) *Attorney, Agent, or Firm* — Smartpat PLC

(57) ABSTRACT

A method for producing thermally crosslinkable polymers in a planetary roller extruder is presented. The planetary roller extruder has a filling part and a compounding part made of a roller cylinder region that comprises at least two, preferably at least three coupled roller cylinders, planetary spindles of which are driven by a common central spindle. The polymers are supplied in a plasticized state. The filling part is supplied with a vacuum. The flow temperatures of the central spindle and the at least two roller cylinders under a vacuum are set such that the polymers to be degassed remain in the plasticized state. One or more liquids, such as thermal crosslinkers, crosslinking accelerators, dye solutions, or dye dispersions, are metered to the plasticized polymers downstream of the vacuum degassing, preferably in a continuous manner. Finally, the resulting mixture is directly supplied to a coating assembly.

13 Claims, 4 Drawing Sheets

(51) Int. Cl.

| | | |
|---|---|---|
| *B29C 48/76* | (2019.01) | |
| *B29C 48/00* | (2019.01) | |
| *B29C 48/14* | (2019.01) | |
| *B29C 48/25* | (2019.01) | |
| *B29C 48/29* | (2019.01) | |
| *B29C 35/04* | (2006.01) | |
| *B29C 48/38* | (2019.01) | |
| *B29C 48/435* | (2019.01) | |
| *B29C 48/44* | (2019.01) | |
| *B29C 48/285* | (2019.01) | |
| *B29C 35/02* | (2006.01) | |
| *B29K 33/04* | (2006.01) | |
| *B29K 63/00* | (2006.01) | |
| *B29K 75/00* | (2006.01) | |
| *B29K 101/12* | (2006.01) | |
| *B29C 48/84* | (2019.01) | |
| *B29C 48/85* | (2019.01) | |
| *B29C 48/80* | (2019.01) | |

(52) U.S. Cl.
CPC .......... *B29C 48/144* (2019.02); *B29C 48/252* (2019.02); *B29C 48/29* (2019.02); *B29C 48/297* (2019.02); *B29C 48/35* (2019.02); *B29C 48/38* (2019.02); *B29C 48/435* (2019.02); *B29C 48/44* (2019.02); *B29C 48/76* (2019.02); *B29C 35/0227* (2013.01); *B29C 48/002* (2019.02); *B29C 48/767* (2019.02); *B29C 48/83* (2019.02); *B29C 48/84* (2019.02); *B29C 48/85* (2019.02); *B29K 2033/04* (2013.01); *B29K 2063/00* (2013.01); *B29K 2075/00* (2013.01); *B29K 2101/12* (2013.01)

(58) Field of Classification Search
CPC .. B29B 7/845; B29B 7/86; B29B 7/94; B29C 48/38; B29C 48/435; B29C 48/44; B29C 48/297; B29C 48/35; B29C 48/76; B29C 48/022; B29C 48/144; B29C 48/252; B29C 48/29; B29C 35/041; B29C 48/84; B29C 48/85; B29C 48/002; B29C 48/767; B29C 48/83; B29C 35/0227; B29C 48/425; B29C 48/43; B29K 2033/04; B29K 2063/00; B29K 2075/00; B29K 2101/12; C09D 175/04
See application file for complete search history.

(56) References Cited

U.S. PATENT DOCUMENTS

| | | | |
|---|---|---|---|
| 5,854,364 A | 12/1998 | Senninger et al. | |
| 5,945,491 A | 8/1999 | Matyjaszewski et al. | |
| 6,506,447 B1* | 1/2003 | Hirsch | B29B 7/726 |
| | | | 427/208.4 |
| 6,720,399 B2 | 4/2004 | Husemann et al. | |
| 6,765,078 B2 | 7/2004 | Husemann et al. | |
| 6,780,271 B1* | 8/2004 | Burmeister | C09J 7/381 |
| | | | 156/244.11 |
| 6,822,048 B1* | 11/2004 | Burmeister | C08G 18/69 |
| | | | 428/355 BL |
| 8,293,158 B2 | 10/2012 | Rust et al. | |
| 8,957,119 B2 | 2/2015 | Rust | |
| 9,193,106 B2 | 11/2015 | Rust et al. | |
| 9,200,129 B2* | 12/2015 | Czerwonatis | B29B 7/7461 |
| 9,328,268 B2* | 5/2016 | Tynan, Jr. | C09J 107/00 |
| 9,926,426 B2 | 3/2018 | Rust | |
| 10,112,320 B2 | 10/2018 | Rust | |
| 10,112,334 B2* | 10/2018 | Douglas | B29C 43/22 |
| 10,112,336 B2 | 10/2018 | Rust | |
| 10,131,760 B2 | 11/2018 | Rust | |
| 2004/0092685 A1 | 5/2004 | Husemann et al. | |
| 2006/0193914 A1* | 8/2006 | Ashworth | A61K 31/277 |
| | | | 424/469 |
| 2007/0173622 A1 | 7/2007 | Tynan et al. | |
| 2008/0118751 A1 | 5/2008 | Zollner et al. | |
| 2009/0048398 A1 | 2/2009 | Zollner et al. | |
| 2010/0104864 A1 | 4/2010 | Zollner et al. | |
| 2013/0203943 A1* | 8/2013 | Kirchhoff | C08F 6/003 |
| | | | 525/332.3 |
| 2014/0011945 A1* | 1/2014 | Tynan, Jr. | B29B 7/526 |
| | | | 524/526 |
| 2014/0057091 A1 | 2/2014 | Krawinkel et al. | |
| 2014/0083608 A1* | 3/2014 | Schubert | C08G 18/3206 |
| | | | 156/272.6 |
| 2014/0335338 A1 | 11/2014 | Burmeister et al. | |
| 2015/0043300 A1* | 2/2015 | Rust | B29B 7/823 |
| | | | 366/75 |
| 2015/0076743 A1* | 3/2015 | Douglas | B29B 7/826 |
| | | | 264/470 |
| 2016/0023376 A1* | 1/2016 | Paul | B29C 48/402 |
| | | | 95/241 |
| 2017/0002236 A1 | 1/2017 | Papenbroock et al. | |
| 2018/0126597 A1 | 5/2018 | Rust | |
| 2018/0126623 A1 | 5/2018 | Rust | |
| 2018/0251624 A1 | 9/2018 | Rust | |
| 2018/0281263 A1 | 10/2018 | Rust | |
| 2020/0040224 A1* | 2/2020 | Dietze | B29B 7/485 |

FOREIGN PATENT DOCUMENTS

| | | |
|---|---|---|
| DE | 19806609 A1 | 8/1999 |
| DE | 19856235 A1 | 5/2000 |
| DE | 19939075 A1 | 2/2001 |
| DE | 19939077 A1 | 2/2001 |
| DE | 10054854 | 1/2008 |
| DE | 102009009775 A1 | 1/2010 |
| DE | 102012212883 A1 | 5/2014 |
| DE | 102013208445 A1 | 11/2014 |
| DE | 102013224774 A1 | 6/2015 |
| DE | 102011112081 A1 | 8/2015 |
| EP | 1077091 A2 | 2/2001 |
| EP | 1311555 B1 | 3/2005 |
| EP | 1978069 A1 | 10/2008 |
| EP | 1791922 B1 | 12/2008 |
| WO | 2018188716 A1 | 10/2018 |
| WO | 2018192677 A1 | 10/2018 |
| WO | 2019011461 A1 | 1/2019 |

\* cited by examiner

METHOD FOR PRODUCING THERMALLY CROSSLINKABLE POLYMERS IN A PLANETARY ROLLER EXTRUDER

TECHNICAL FIELD

The invention concerns a of method for producing thermally cross-linkable polymers in a planetary roller extruder.

BACKGROUND

Many aggregates for the continuous production and processing of solvent-free and/or thermally cross-linkable polymer systems are known. Mostly, screw machines such as single-screw extruders, twin-screw extruders or planetary roller extruders of different process length and equipment are applied. But also continuously working kneaders of most divers types of construction, for example also combinations of kneaders and screw machines, are used for this task.

Extruders, (single-screw extruders and twin-screw extruders, planetary roller extruders) are especially applied in the processing of plastics. Thereby, the plastic is usually used in form of a pellet and is plasticized by the extruder and discharged via a die which brings the plastic in the desired form.

In plastic processing, plastification refers to the conversion of powdery or granular plastics by temperature and pressure, thus a reduction of the viscosity of the material. At this, in the processing machines, for example the extruders, the plastics are heated above their specific melt temperatures so that they form a hot, homogeneous plastic mass. When the plastic then is plasticized, it can be moulded in a further process to, for example, pipes, sheets, films or die casting components. Thus, also a coating on a ground such as a carrier material is possible.

In addition, the term "plastification" refers to the decomposition of softeners (plasticizers, plastificator agents, plasticators) into plastics, i.e. chemical substances that influence the elasticity of the material.

Besides the plasticizing, the task of the extruder is to homogenize the melt. Mostly, additives and aggregates must be incorporated into the polymer matrix. In this case, the extruder has the task to distribute the aggregates and additives evenly.

Initially, the planetary roller extruders were applied in the processing of thermoplastics such as PVC, where they were mainly used for feeding of the subsequent units, for example calendars or roller mills. Due to the advantages of the large surface renewal for material and heat exchange, with which the energy introduced by friction can be dissipated quickly and effectively, as well as the low dwell time and the narrow dwell time spectrum, their field of application has recently also extended to compounding processes which require a special temperature controlled operation mode.

Depending on the manufacturer, planetary roller extruders are available in different designs and sizes. Depending on the desired throughput capacity, the diameters of the cylinder assemblies are typically between 70 mm and 400 mm.

For the processing of plastics, planetary roller extruders normally have a feed part and a compounding unit.

The feed part consists of a feed screw on which the polymers to be plasticized and, if applicable, at least a part of further solid components are dosed continuously. Then, the feed screw transfers the material to the compounding part. Within the compounding part, additional solid matters can be supplied when required, which preferably takes place via side screw dosing units, which supply the material via openings in the shell of the cylinder assembly into the planetary roller extruder and avoid the discharge of the already plasticized polymers.

The feeding of liquid components of the formulation occurs normally not via the feed part of the planetary roller extruder, but only downstream in the compounding part, as the liquids often influence unfavourably the plastification process of the polymers. The addition of the liquid components can then occur via opening between the cylinder assemblies or via a special boring in the shell of one cylinder assembly.

The area of the feed part with the screw is preferably cooled in order to avoid cakings of the materials on the screw. There are also embodiments existing without screw part at which the material is directly supplied between central spindle and planetary spindles.

The compounding part consists of a driven central spindle and several planetary spindles which are rotating around the central spindle within one or several cylinder assemblies with internal helical toothing. The speed of the central spindle and thus the rotational speed of the planetary spindles can be varied and is thus an important parameter concerning the controlling of the compounding process.

The surrounding housing has in modern design a double shell. The inner shell is formed by a liner which is equipped with the internal toothing. The important cooling of the planetary roller extruder is intended between inner and outer shell.

The planetary spindles do not need guidance in circumferential direction. Due to the toothing it is ensured that the distance of the planetary spindles in circumferential direction remains the same. It can be spoken of a self-guidance.

The materials are revolved between central spindle and planetary spindles or between planetary spindles and helical toothing of the roller part so that under the influence of shear energy and exterior heating-cooling the dispersion of the materials to a homogeneous compound takes place.

The number of the planetary spindles rotating in each cylinder assembly can be varied and thus adjusted to the requirements of the process. The number of spindles influences the free volume within the planetary roller extruder, the dwell time of the material in the process and determines also the area size for the heat and material exchange. The number of the planetary spindles has via the supplied shear energy influence on the compounding result. At a constant diameter of the cylinder assembly a better homogenization and dispersion performance and a greater throughput of the product respectively can be achieved with a greater number of spindles.

The maximal number of planetary spindles that can be assembled between central spindle and cylinder assembly depends on the diameter of the cylinder assembly and the diameter of the used planetary spindles. When using larger roller diameters as they are necessary to achieve throughput rates in production scale, or smaller diameters for the planetary spindles, the cylinder assemblies can be equipped with a larger number of planetary spindles. Typically, up to seven planetary spindles are used for a cylinder diameter of D=70 mm, whereas, for example, up to ten are used at a roller diameter of D=200 mm and at a roller diameter of D=400 mm, for example, 24 planetary spindles can be used.

With regard to the other extruders mentioned, planetary roller extruders have an extremely large plastification effect. This opens up the possibility to process raw materials which in the other extruders are not at all or only insufficiently usable. But planetary roller extruders can also be used in order to increase considerably the production performance.

All extruders have the problem that gaseous components can arise in the melt which are unwanted or which, in the further manufacturing process, influence negatively the quality of the product to be manufactured.

Such components can be for example water, air or (residual) solvents. Some polymers or fillers take up water. These polymers either have to be pre-dried or the vapour occurring in the extruder must be dissipated.

Gaseous components which are desirable at the beginning and undesirable in the further processing operation may be organic solvents, water, air, reaction accelerators or reaction inhibitors or inert gases such as nitrogen, argon or carbon dioxide. As far as no complete chemical conversion of these gases takes place, residues remain with monomeric, oligomeric degradation products and decompositions products.

The proportion of volatile liquid components in plasticized polymers can often be up to 3 to 4% by weight, but in extruded polymers it may be usually not more than 0.1% by weight.

There are several reasons that force to degas.

These include:

Improvement of the product quality

Avoidance of damage to health

Reduction of costs

Avoidance of a chemical degradation

Execution of further process steps

For degassing, different devices are offered. Mostly, the degassing is carried out at the extruder. At first, a degassing zone at the extruder is defined which normally is arranged at the end of the process length directly ahead of the discharge of the polymers out of the extruder. A disadvantage of this degassing position is that also easily vaporizable liquid components that should actually remain in a defined amount in the polymer, such as cross-linking agents, plasticizers, etc., can be removed in undefined manner from the polymers by the unwanted evaporation.

For degassing, different solutions are offered. All solutions are based on the fact that the volatile matters dissolved in the melt are released by pressure reduction. Inevitably, the gas then dissolves from the melt. Gas bubbles can then be withdrawn.

As a gas vent, an opening provided in the area of the pressure drop is already suitable on the shell/housing of the extruder, with is optionally connected to a suction line. At cascade extruder lines the degassing mostly takes place between the primary extruder and the secondary extruder.

In operation it becomes obvious that the degassing zone is a relatively sensible zone. Here, the aim is to achieve the best possible separation of gas and polymer melt and to prevent the plasticized materials from discharging.

It is known that the degassing in the planetary roller extruder takes place in the area of the stop rings. The degassing at this position is only sufficiently effective for a few materials: Materials with higher viscosities, as is the case with most plasticized polymers, can usually not be degassed or degassed in the desired manner and completeness, since it often takes a very short time to clog the degassing opening with materials, which then even can lead to a complete loss of degassing capability.

Planetary roller extruders are composed of single cylinder assemblies in modular construction. Each module consists of a central spindle common to all modules, planetary spindles rotating around the central spindle and a housing. Number and type of the planetary spindles can be different in each module and adjusted to the special processing task of the module. The housings of the modules are equipped with flanges at the ends, with which the modules can be coupled together. The front surfaces of the modules are connected to each other by means of intermediate rings which are available in different designs. For example, there are intermediate rings reducing the free cross section at the end of a cylinder assembly and thus influence the dwell time in the upstream cylinder assembly and thus can influence, for example the dispersion process. Furthermore, there are embodiments of intermediate rings which do not influence the conveying characteristic of the material within the planetary roller extruder.

For a degassing in a planetary roller extruder, the intermediate rings are chosen in that way, that they dispose at the desired degassing position over at least one radial boring, via which the gaseous components can escape.

According to the DE 100 54 854 A1, in the area of intermediate rings executed as stop rings there are simultaneously retaining disks intended so that the melt after the passage at the retaining disk can reach from an area with higher pressure into an area with lower pressure. The area with lower pressure is located in conveying direction of the extruder behind the retaining disk.

The low pressure is achieved be an area with less pressure effect. This can be obtained, for example, by an interruption of the teeth of the planetary spindles. An area without pressure effect can be achieved when the planetary spindles have no teeth in that area or that a volume increase occurs in that way that the planetary spindles begin at some distance from the retaining disk.

A back venting alone or additionally of the melt is a variant for degassing, a proposal according to DE 198 56 235 A1. The back venting takes place in that a gas drawing off takes place before in the compression zone of the feed part a material compaction occurs which prevents the passage of gas. Depending on the distance of the material compaction preventing the passage of gas, the back venting may have, for example, a distance up to 80 cm from the material feed in feed direction of the material.

The back venting comprises as well that the emitted gas flows back through the material supply or the back venting takes place at the extruder in axial direction and conveying direction before the supply of the raw material.

Preferably the back venting takes place within the scope of a multi-stage degassing and generates the back venting in the area of the feeding of the raw material the first degassing step in which especially air is drawn off.

For the degassing it may be sufficient when only openings are existent through which the gas or the drawn-in air can escape. But the degassing can be also reinforced by applying an induced draught.

The back venting is of advantage when the extruder is designed as planetary roller extruder section in the area of the gas flow. Between the rotating planetary spindles, the planetary roller extruder section offers special favourable gas passages.

It may be sufficient for the degassing when only openings are existent through which the gas or the drawn-in air can escape. But the degassing can be reinforced by applying an induced draught.

Nevertheless, it becomes obvious that the known degassing methods are not sufficient to reduce the gas content in the polymer melts to very low values. Furthermore, it is so far not possible to produce thermally cross-linkable polymers in such a way in a planetary roller extruder that a very reactive mass can be discharged out of the extruder which can be cross-linked only at a later date.

SUMMARY

The task of the present invention is to overcome the disadvantages of the previous processes for the production of thermally cross-linkable polymers so that thermal cross-linking agents and other vaporizable liquids can be incorporated in a defined quantity into those plasticized polymers, so that an inline coating is possible without further procedural steps and so that the plasticized polymers are discharged out of the mixing unit almost free of bubbles.

This task is solved with a method for the production of thermally cross-linkable polymers, as stated in the main claim. Subject of the subclaims are advantageous embodiments of the object of invention.

Accordingly, the invention relates to a method for the production of thermally cross-linkable polymers in a planetary roller extruder having the following steps:

a) The planetary roller extruder has a feed part and a compounding part which is composed of a cylinder assembly area consisting at least of two, preferably of at least three coupled cylinder assemblies, the planetary spindles of which are driven by one single common central spindle.

b) The polymers are fed into the planetary roller extruder in a plasticized condition.

c) The plasticized polymers are supplied into the first cylinder assembly, namely within the first half of the first cylinder assembly.

d) The feed part of the planetary roller extruder is charged with vacuum.

e) If the area of the cylinder assemblies is formed of two cylinder assemblies, the shell of the second cylinder assembly has an opening via which the plasticized polymers are released from air and, where required, from further volatile components.

Or as far as the area of the cylinder assemblies is formed of more than two cylinder assemblies, the shell of the second cylinder assembly has at least three openings or the shell of a downstream connected cylinder assembly one opening, for example the third cylinder assembly, via which the plasticized polymers are released by means of vacuum from air and, where required, from further volatile components.

f) The pre-flow temperatures of the central spindle and the at least two cylinder assemblies under vacuum are adjusted in that way that the polymers to be degassed remain in the plastic condition.

g) Downstream of the degassing, by means of vacuum, one or more liquids, such as thermal cross-linking agents, cross-linking accelerators, dyestuff solvents or dyestuff dispersions, are preferably added continuously to the plasticized polymers, thus into the second cylinder assembly or into one or more of the additional cylinder assemblies that may be existent or into the intermediate rings between the second and third cylinder assembly or between the third and fourth cylinder assembly, etc.

h) The blend of plasticized polymers and liquids are cooled in the area of the cylinder assembly, in which the liquids are incorporated into the plasticized polymers, so that after discharge of the blend of the planetary roller extruder no evaporation of the liquids, preferably homogeneously mixed in the plasticized polymers, occurs.

i) The length of the area of the cylinder assemblies, in which a degassing of the plasticized polymers takes place by means of vacuum, is between more than 50% and 80%, preferably between 60% and 70% of the length of the entire area of the cylinder assemblies.

j) The blend of plasticized polymers and modifying liquids is supplied preferably without further additional processing to a coating device, further preferably inline, i.e. without intermediate filling or decanting with subsequent re-melting.

According to step d), the feed part of the planetary roller extruder is charged with vacuum, by means of which the plasticized polymers entering downstream the feed part are at least partially released of air and optionally further volatiles components. This means, the air or the further volatile components walk upstream against the mass flow.

According to a preferred embodiment, there can be in addition to the opening mentioned in feature e) in the shell of the second or a downstream cylinder assembly, further openings in the shells of the cylinder assemblies, which subsequently always follow downstream.

According to a preferred embodiment, there is already additionally at least one opening existent in the shell of the first cylinder assembly via which the plasticized polymers can be released by means of vacuum from air and if necessary further volatile components.

Further preferred, the degassing takes place in the feed part or the shell opening of the first cylinder assembly, in that a pressure of less than 50 mbar, preferably a pressure of less than 10 mbar, is present at the outlet of the feed part or at the shell opening of the first cylinder assembly.

According to a further preferred embodiment of the invention, the opening in the shell of the second cylinder assembly is equipped with a product holding-down device preventing the discharge of the plasticized polymers out of the planetary roller extruder.

Further preferred, the product holding-down device is designed an intermeshing twin-screw pair, via the free flanks of which air as well as—if necessary—further volatile components are drawn-off of the plasticized polymers under the influence of heat and vacuum.

According to a further preferred embodiment of the invention, the polymers downstream the degassing in the second cylinder assembly are continuously supplied with one or more liquids and by means of the central spindle and the planetary spindles as homogeneously as possible mixed into the plasticized polymers. If there are more than two cylinder assemblies, the liquids can also be supplied into these.

Homogeneous in the sense of the present invention means, mesoscopic and macroscopic homogeneous as well as independent of direction in the properties.

According to a further preferred embodiment of the invention, the supply of the liquids into the plasticized polymers takes place in an intermediate ring, which is located between the second and the preferably inserted third cylinder assembly and which disposes at least of one radial boring for the purpose of supplying the modified liquids.

According to a further preferred embodiment of the invention, the supply of the modified liquids into the planetary roller extruder takes place via one or more borings in the shell of a cylinder assembly, whereat the borings are preferably located in an area within the first half of the cylinder assembly.

It is imperative that these borings are located downstream behind the opening in the shell of the second cylinder assembly.

Further preferably, the supply of the modified liquids into the planetary roller extruder occurs via a pressure retention valve.

Further preferably, the supply of the plasticized polymers into the planetary roller extruder occurs through an opening in the wall of the shell of the first cylinder assembly.

Alternatively, the supply of the plasticized polymers into the planetary roller extruder can take place via an intermediate ring, which is located between the feed part and first cylinder assembly which has at least one radial boring for the purpose of feeding the plasticized polymers.

Further it is preferred when the supply of the plasticized polymers into the planetary roller extruder takes place by means of a melt pump, by means of a single or multi-shaft extruder or by means of a barrel melting unit or tank melting device.

According to a further preferred embodiment of the invention, the discharge of the blend out of the planetary roller extruder occurs by means of a melt pump connected to the end of the area of the cylinder assembly.

The heat exchange in the planetary roller extruder takes place preferably via the central spindle and/or the cylinder assemblies, which are for this operated cia heating-cooling devices with the heating-cooling medium.

In order to be able to process a wide range of formulations and to be able to adjust the properties of the polymerisates selectively, a flexible temperature control is necessary; it is therefore advantageous to use separate heating-cooling circuits for the central spindle and the cylinder assemblies and, if appropriate, also to equip the cylinder assemblies with more than one heating-cooling circuit.

For thermodynamic reasons, water or pressurized water is preferred, but the process is not restricted to this.

A planetary roller extruder according to the invention is shown in a particularly advantageous embodiment in FIG. 4.

Moreover, the coating device is a calendar or a die through which the blend is applied to a carrier material.

According to the invention it is proposed, to execute the coating of the preferentially produced adhesives by means of a multi-roller coating unit. These may be coating units consisting of at least two rollers with at least one roller gap up to five rolls with three roller gaps.

Also possible are coating units such as calendars (I, F, L-calendars) so that the preferred adhesive mass is formed by passing one or more roller gaps to the required thickness.

In order to improve the transfer behaviour of the formed mass layer from one roll to another, anti-adhesive finished rolls or anilox rolls can be further utilized. In order to produce a sufficiently precise formed adhesive film, the circumferential velocities of rolls can have differences.

The preferred 4-roller coating unit consists of a dosing roll, a doctor roll which determines the thickness of the layer on the carrier material and which is arranged parallel to the dosing roll, and a transfer roll being located below the dosing roll. On the lay-on roll, which together with the transfer roll forms a second roller gap, the mass and the web-shaped material are brought together.

Depending on the type of the web-shaped carrier material to be coated, the coating can be executed in synchronized or counter-rotating process.

The molding unit can also be designed by a gap resulting between a roll and a fixed doctor knife. The fixed doctor knife can be a knife or a fixed (half) roll.

The process according to the invention is characterized in that the mixtures of plasticized polymers and the preferably as liquid used thermal cross-linkers and/or cross-linking accelerators are cooled in the cylinder assembly area in which the thermal cross-linkers or cross-linking accelerators are incorporated into the plasticized polymers, i.e. are cooled in that way that the time from which the mixture begins to cross-link (gelation) is at least doubled opposite to the time that the plasticized polymers have in the cylinder assembly area in which they are released from air and any volatile components under vacuum.

According to a preferred embodiment of the invention, the plasticized polymers are polymers of the group of the non-thermoplastic elastomers, the thermoplastic synthetic rubbers, polyacrylates, polyurethanes, polyepoxides, as well as mixtures in any proportions thereof.

Further preferably, the plasticized polymers are blended with, for example, tackifying resins, fillers, softeners, oils, thixotropic agents and optionally further additives.

Besides other liquid like oils or softeners, especially thermal cross-linkers and/or cross-linking accelerators are used.

Especially preferred are pressure-sensitive self-adhesive or structural adhesive masses which are mixtures coming from the planetary roller extruder.

Especially preferred are produced thus adhesive tape rolls from the ACX$^{plus}$ assortment of Messrs. tesa.

Those adhesive tapes comprise a carrier layer which is also named hard phase. The polymer basis of the hard phase is preferably chosen from the group consisting of polyvinyl chlorides (PVC), polyethylene terephthalates (PET), polyurethanes, polyolefins, polybutylene terephthalates (PBT), polycarbonates, polymethyl methacrylates (PMMA), polymethyl methacrylates (PVB), ionomers and blends of two or more polymers mentioned above. Especially favoured is the polymer basis of the hard phase, chosen from the group consisting of polyvinyl chlorides, polyethylene terephthalates, polyurethanes, polyolefins and mixtures of two or more of the above mentioned polymers. The hard phase is essentially a polymer film the polymer basis of which is chosen of the above mentioned materials. By a "polymer film" is meant a thin, planar, flexible, windable web whose material base is essentially formed by one or more polymer(s).

"Polyurethanes", in the broadest sense of the term, are polymeric substances in which repeating units are linked by urethane groupings —NH—CO—O—.

The term "polyolefins" means polymers containing at least 50% repetitive units of the general structure —[–$CH_2CR^1R^2$]$_n$—, where $R^1$ is a hydrogen atom and $R^2$ is a hydrogen atom or a linear or branched, saturated, aliphatic or cycloaliphatic group. As far as the polymer base of the hard phase comprises polyolefins, these are referring preferably to polyethylenes, especially polyethylenes with ultra-high molar mass (UHMWPE).

The term "polymer basis" means the polymer or the polymers representing the largest proportion by weight of all the polymers contained in the respective layer or phase.

The thickness of the hard phase amounts especially to ≤150 µm. Preferred, the thickness of the hard phase amounts to 10 to 150 µm, especially preferred to 30 to 120 µm and particularly to 50 to 100 µm, for example 70 to 85 µm. The term "thickness" is used to denote the extent of the respective layer or phase along the z-ordinate of an imaginary coordinate system in which the plane spanned by the machine direction and the transverse direction to the machine direction forms the x-y-plane. The thickness is determined by measuring at least five different positions of the relevant layer or phase and subsequent formation of the arithmetic average from the obtained measurement results. The thickness measurement of the hard phase is in line with the DIN EN ISO 4593.

Such adhesive tapes may further have a soft phase comprising a polymer foam, a viscoelastic mass and/or an elastomeric mass. The polymer base of the soft phase is preferably selected from polyolefins, polyacrylates, polyurethanes and mixtures of two or more of the polymers listed above. In the simplest version, the adhesive tape consists only of a soft phase.

The term "polymer foam" means a structure of gas-filled spherical or polyhedron-shaped cells, which are bounded by liquid, semi-liquid, high-viscous or solid cell walls; furthermore, the main component of the cell walls is a polymer or a mixture of several polymers.

The term "viscoelastic mass" means a material which, in addition to features of pure elasticity (returning to the initial state after external mechanical action) has also features of viscous liquid, for example the occurrence of internal friction during deformation. In particular, polymer-based pressure-sensitive adhesives are regarded as viscoelastic masses.

The term "elastomer mass" means a material that has the rubber-elastic behavior and can be stretched repeatedly to at least twice its length at 20° C. and after removal of the enforcement required for the stretching, immediately regains almost its initial dimension.

For the understanding of the terms "polymer base", "polyurethanes" and "polyolefins", the above applies. The term "polyacrylates" means polymers, the molar monomer base of which consists of at least 50% acrylic acid, methacrylic acid, acrylic esters and/or methacrylic esters whereat acrylic esters and/or methacrylic esters are contained at least proportionately generally and preferred at least at 50%. In particular, a "polyacrylate" means a polymerizate which is obtainable by radical polymerization of acrylic and/or methylacrylic monomers and optionally other, copolymerizable monomers.

Especially preferred is the polymer base of the soft phase chosen from polyolefins, polyacrylates and blends of two or more of the preceding polymers. In case, polyolefins belong to the polymer base of the soft phase, these are preferably selected from polyethylenes, ethylene-vinyl acetate-copolymers (EVA) and blends of polyethylenes and ethylene-vinyl acetate-copolymers (PE/EVA-blends). The polyethylenes can be different polyethylene types, for example HDPE, LDPE, LLDPE blends of these polyethylene types and/or mixtures of them.

In an embodiment, the soft phase comprises a foam and an pressure sensitive layer arranged each above and below the foamed layer, whereat the polymer base of the foam consists of one or more polyolefin(s) and the polymer base of the pressure sensitive ashesived layers of one or more polyacrylate(s). Especially preferred, the polymer base of the foam consists of one or more polyethylene(s), ethylene-vinyl acetate copolymer(s) and blends of one or more polyethylene(s) and/or ethylene-vinyl acetate copolymer(s). Most preferred, the polymer base of the foam consists of one or more polyethylene(s).

The polyolefin-based foam itself is not or only very slightly tacky. The compound with the hard phase or the substrate is therefore advantageously effected by the pressure-sensitive adhesive layers. The foaming of the polyolefin-based raw material of the foam is preferably caused by added propellant gas in the sense of physical foaming and/or by a chemical foaming agent, for example by azodicarboxylic acid diamine.

In another embodiment, the soft phase is a pressure-sensitive adhesive polymer foam whose polymer base consists of one or more polyacrylates. "Pressure-sensitive adhesive foam" means that the foam itself is a pressure-sensitive adhesive and thus an application of an additional pressure-sensitive adhesive layer is not required. This is advantageous because fewer layers need to be joined together in the manufacturing process and the risk of separation phenomena and other unwanted phenomena at the borders of the layers is reduced.

Self-adhesive masses, also called pressure-sensitive adhesives, are in the sense according to the invention in particular those polymeric masses which—where applicable by suitable additivation with further components as for example adhesive resins at the application temperature (unless otherwise defined, at room temperature) are permanently tacky and potentially adhesive and adhere on a multitude of surfaces during contact, in particular adhere immediately (have a so-called "tack"). They are able, already at application temperature without activation by solvents or heat—but normally by the influence of a more or less high pressure—to wet sufficiently a substrate to be bonded so that sufficient interactions for the adhesion between the mass and the substrate can be generated. For this essential influencing parameters are amongst others the pressure and the contact time. The special properties of the pressure-sensitive adhesives are tracing back in particular to their viscoelastic properties. Thus, for example, weakly or strongly adhesive glues can be produced; furthermore those which can be glued only once and permanently so that the adhesion cannot be released without destroying the adhesive and/or the substrates, or those which are easily detachable and if necessary can be adhered several times.

Pressure-sensitive adhesives can basically be prepared on the basis of polymers of different chemical nature. The pressure-sensitive adhering properties are influenced, inter alia, by the type and proportions of the monomers used in the polymerization of the polymers underlying the pressure-sensitive adhesive, their average molar mass and molar mass distribution as well as by the type and quantity of the additives of the pressure-sensitive adhesive, such as adhesive resins, softeners and the like.

In order to achieve the viscoelastic properties, the monomers on which the polymers, underlying the pressure-sensitive adhesive, are based, as well as optionally further available components of the pressure-sensitive adhesive are chosen especially that the pressure-sensitive adhesive has a glass transition temperature (according to DIN 53765) below the application temperature (i.e. usually below the room temperature). By suitable cohesion-enhancing measures, such as cross-linking reactions (formation of bridging linkages between the macromolecules), the temperature range in which a polymer mass has pressure-sensitive adhesive properties can be increased and/or shifted. The application range of the pressure-sensitive adhesives can thus be optimized by an adjustment between flowability and cohesion of the mass.

A pressure-sensitive adhesive becomes permanently tacky at room temperature, i.e. it has a sufficiently low viscosity and a high degree of tack, so that it wets the surface of the respective adhesive substrate already at low pressure. The bondability of the adhesive is based on its adhesive properties and its detachability on its cohesive properties.

The polyacrylates are preferably obtainable by at least partially polymerizing functional monomers which are cross-linkable with epoxy groups. These are particularly preferably monomers having acid groups (especially carboxylic acid, sulfonic acid or phosphonic acid groups) and/or hydroxyl groups and/or acid anhydride groups and/or epoxide groups and/or amine groups; particular preference is given to monomers containing carboxylic acid groups.

It is particularly advantageous if the polyacrylates have polymerized acrylic acid and/or methacrylic acid. All of these groups have a cross-linking ability with epoxide groups, as a result of which the polyacrylates are advantageously accessible to thermal cross-linking with added epoxides.

Other monomers, which can be used as co-monomers for polyacrylates are, in addition to acrylic acid- and/or methacrylic acid esters with up to 30 carbon atoms for example vinyl esters of up to 20 carbon atoms containing carboxylic acids, vinyl aromatics with up to 20 carbon atoms, ethylenic unsaturated nitriles, vinyl halides, vinyl esthers of 1 to 10 carbon atoms containing alcohols, aliphatic hydrocarbons with 2 to 8 carbon atoms and 1 or 2 double bonds or mixtures of these monomers.

The properties of the polyacrylate in question can be influenced in particular by a variation of the glass transition temperature of the polymer by different weight proportions of the individual monomers. Polyacrylates may preferably be traced back to the following monomeric composition:

a) Acrylic acid esters and/or methacrylic acid esters of the following formula $CH_2=C(R^I)(COOR^{II})$
where $R^I$=H or $CH_3$ and $R^{II}$ is an alkyl radical with 4 to 14 carbon atoms,
b) olefinic unsaturated monomers with functional groups already defined for a reactivity with expoxide groups,
c) optionally further acrylates and/or methacrylates and/or olefinic unsaturated monomers which are co-polymerizable with the component (a).

Preferably, the polyacrylates are based on a monomer composition in which the monomers of the component (a) are contained with a portion of 45 to 99% by weight, the monomers of the component (b) with a portion of 1 to 15% by weight and the monomers of the component (c) with a portion of 0 to 40% by weight (the information is based on the monomer blend for the "base polymer", i.e. without addition of possible additives to the finished polymer, such as resins, etc.). In this case, the polymerization product has a glass transition temperature $\leq 15°$ C. (DMA at low frequencies) and pressure-sensitive adhesive properties.

The monomers of the component (a) are in particular softening and/or nonpolar monomers. Preferably are used as monomers (a) acrylic and methacrylic esters with alkyl groups consisting of 4 to 14 carbon atoms, especially preferred 4 to 9 carbon atoms. Examples of such monomers are n-butyl acrylate, n-butyl methacrylate, n-pentyl acrylate, n-pentyl methacrylate, n-amyl acrylate, n-hexyl acrylate, n-hexyl methacrylate, n-heptyl acrylate, n-octyl acrylate, n-octyl methacrylate, n-nonyl acrylate, isobutyl acrylate, isooctanol acrylate, isooctanol methacrylate, and their branched isomers, such as 2 ethylhexyl acrylate or 2 etheyhexyl methacrylate.

The monomers of component (b) are in particular olefinical unsaturated monomers with functional groups, in particular functional groups, which can undergo reaction with epoxide groups.

Preferably used are for the component (b) are monomers with functional groups selected from the group comprising: hydroxy, carboxy, sulfonic acid or phosphonic acid groups, acid anhydride, epoxides, amines.

Particularly preferred examples for monomers of the component (b) are acrylic acid, methacrylic acid, itaconic acid, maleic acid, fumaric acid, crotonic acid, aconitic acid, dimethylacrylic acid, β-acryloyloxypropionic acid, trichloroacrylic acid, vinyl ethanoic acid, vinylphosphonic acid, itaconic acid, maleic anhydride, hydroxyethyl acrylate, hydroxypropyl acrylate, hydroxyethyl methacrylate, hydroxypropyl methacrylate, 6-hydroxyhexyl methacrylate, allyl alcohol, glycidyl acrylate, glycidyl methacrylate.

In principle, as component (c) can be used all vinylically functionalized compounds which are co-polymerizable with the component (a) and/or the component (b). The monomers of component (c) can serve to adjust the properties of the resulting pressure-sensitive adhesives.

Exemplary monomers of the component (c) are: methyl acrylate, ethyl acrylate, propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, tert-butylphenyl acrylate, tert-butylphenyl methacrylate, dodecyl methacrylate, isodecyl acrylate, lauryl acrylate, n-undecanoic acrylate, stearyl acrylate, tridecyl acrylate, behen acrylate, cyclohexyl methacrylate, cyclopentyl methacrylate, phenoxyethyl acrylate, phenoxyethyl methacrylate, 2-butoxyethyl methacrylate, 2-butoxy-ethyl acrylate, 3,3,5-trimethylcyclohexyl acrylate, 3,5-dimethyladamanthyl acrylate, 4-cumylphenyl methacrylate, cyano ethyl acrylate, cyano ethyl methacrylate, 4-biphenyl acrylate, 4-biphenyl methacrylate, 2-naphthyl acrylate, 2-naphthyl methacrylate, tetrahydrofurfuryl acrylate, diethylaminoethyl acrylate, diethylaminoethyl methacrylate, dimethylaminoethylacrylate, dimethylaminoethylmethacrylate, 2-butoxyethylacrylate, 2-butoxyethyl methacrylate, 3-methoxyacrylic acid methyl ester, 3-methoxybutyl acrylate, phenoxyethyl acrylate, phenoxyethyl methacrylate, 2-phenoxyethyl methacrylate, butyldiglycol methacrylate, ethylene glycol acrylate, ethylene glycol monomethyl acrylate, methoxy polyethylene glycol methacrylate 350, methoxy polyethylene glycol methacrylate 500, propylene glycol mono methacrylate, butoxy diethylene glycol methacrylate, ethoxy triethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate, dimethylaminopropylacrylamide, dimethylaminopropylmethacrylamide, N-(1-methylundecyl)acrylamide, N-(n-butoxymethyl) acrylamide, N-(butoxymethyl) methacrylamide, N-(ethoxymethyl) acrylamide, N-(n-octadecyl) acrylamide, furthermore N,N-dialkyl-substituted amides, for example N,N-dimethylacrylamide, N,N-dimethylmethacrylamide, N-benzyl-acrylamides, N-isopropylacrylamide, N-tert-butylacrylamide, N-tert-octylacrylamide, N-methylolacrylamide, N-methylolmethacrylamide, acrylonitrile, methacrylonitrile, vinyl ether, such as vinyl methyl ether, ethyl vinyl ether, vinyl isobutyl ether, vinyl ester, such as vinyl acetate, vinyl chloride, vinyl halides, vinylidene chloride, vinylidene halides, vinylpyridine, 4-vinylpyridine, N-vinylphthalimide, N-vinyl lactam, N-vinylpyrrolidone, styrene, a- and p-methylstyrene, a-butylstyrene, 4-n-butylstyrene, 4-n-decylstyrene, 3,4-dimethoxystyrene. Macromonomers such as 2-polystyrene-ethyl methacrylate (molecular weight $M_w$ from 4,000 to 13,000 g/mol), poly (methylmethacrylate)ethyl methacrylate ($M_w$ from 2,000 to 8,000 g/mol).

Advantageously, monomers of the component (c) may also be chosen such that they contain functional groups which support subsequent radiochemical cross-linking (for example by electron beams, UV). Suitable co-polymerizable photoinitiators are, for example, benzoin acrylate and acrylate-functionalized benzophenone derivatives. Monomers which support cross-linking by electron irradiation are, for example, tetrahydrofurfuryl acrylate, N-tert-butylacrylamide and allyl acrylate.

The production of the polyacrylates ("polyacrylates" is to be understood in the context of the invention as synonymous with "poly(meth)acrylates") can be executed according to the common method known to the professional, in particular advantageous by conventional radical polymerizations or controlled radical polymerizations. The polyacrylates can be produced by copolymerization of the monomeric components using the customary polymerization initiators and, if appropriate, regulators, where polymerization is carried out at the usual temperatures in substance, in emulsion, for example in water or liquid hydrocarbons, or in solution.

Preferably, the polyacrylates are produced by polymerization of the monomers in solvents, in particular in solvents having a boiling range of 50 to 150° C., preferably from 60 to 120° C. using the usual amounts of polymerization initiators, which are generally at 0.01 to 5, particularly at 0.1 to 2% by weight (based on the total weight of the monomers).

All conventional initiators familiar to the professional are suitable. Examples of radical sources are peroxides, hydroperoxides and azo compounds, for example dibenzoyl peroxide, cumene hydroperoxide, cyclohexanone peroxide, di-t-butyl peroxide, cyclohexylsulfonyl acetyl peroxide, diisopropyl percarbonate, t-butyl peracetate, benzpinacol. In a very preferred procedure, the radical initiator used is 2,2'-azobis (2-methylbutyronitrile) (Vazo® 67™ from DuPont) or 2,2'-azobis (2-methylpropionitrile) (2,2'-azobisisobutyronitrile; AIBN; Vazo® 64™ from DuPont).

A possibility as solvents for the production of the polyacrylates are alcohols such as methanol, ethanol, n- and iso-propanol, n- and iso-butanol, preferably isopropanol and/or isobutanol, and hydrocarbons such as toluene and especially benzene of a boiling range of 60-120° C. Furthermore, ketones, such as, preferably, acetone, methyl ethyl ketone, methyl isobutyl ketone and esters, such as ethyl acetate, and blends of solvents of the type mentioned may be used, whereat mixtures containing isopropanol, in particular in amounts of from 2 to 15% by weight, preferably from 3 to 10% by weight, based on the solvent blend used, are preferred.

Preferably, after the production (polymerization) of the polyacrylates, a concentration takes place, and the further processing of the polyacrylates takes place essentially solvent-free. The concentration of the polymerizate can occur in the absence of cross-linker and accelerator substances. However, it is also possible to add one of these compound classes to the polymer even before the concentration, so that the concentration then takes place in the presence of this (these) substance (s).

After the concentration step the polymers can be converted into a compounder. If desired, the concentration and the compounding can also take place in the same reactor.

The weight-average molecular weights $M_w$ of the polyacrylates are preferably in a range from 20,000 to 2,000,000 g/mol; very preferably in a range of 100,000 to 1,000,000 g/mol, most preferably in a range of 150,000 to 500,000 g/mol (the values of the average molecular weight $M_w$ and the polydispersity PD in this specification refer to the determination by gel permeation chromatography). The eluent used was THF containing 0.1% by volume of trifluoroacetic acid. The measurement was carried out at 25° C. The precolumn used was PSS-SDV, 5 µm, $10^3$ Å, ID 8.0 mm×50 mm. For separation, the columns PSS-SDV, 5 µm, $10^3$ Å, 105 Å and $10^6$ Å with each ID 8,0 mm×300 mm were used.

The sample concentration was 4 g/l, the flow rat 1.0 ml per minute. It was measured against PMMA-standards.

The weight-average molecular weight $M_w$ is determined by means of gel permeation chromatography (GPC). As eluent, THF with 0.1% by volume trifluoroacetic acid is used. The measurement takes place at 25° C. For Separation are used the columns PSS-SDV, 5µ, $10^3$ Å and $10^6$ Å with each ID 0.8 mm×300 mm. The sample concentration amounts to 4 g/l, the flow rate to 1.0 ml per minute. It is measured against PMMA-standards. (µ=µm, 1 Å=$10^{-10}$ m). For this purpose it may be advantageous to carry out the polymerization in the presence of suitable polymerization regulators, such as thiols, halogen compounds and/or alcohols, in order to set the desired average molecular weight.

The polyacrylate preferably has a k-value from 30 to 90, more preferably from 40 to 70, measured in toluoyl (1% solution, 21° C.). According to Fikentscher, k-value is a measure of the molecular weight and the viscosity of the polymerizate.

Especially suitable are polyacrylates having a molecular weight distribution (polydispersity <4). Despite the relative low molecular weight, the masses have a particularly good shearing resistance after the crosslinking. Moreover, the lower polydispersity allows an easier processing from the melt, as the flow viscosity is lower than that of a more widely distributed polyacrylate at largely the same application properties. Narrow distributed poly(meth)acrylates can advantageously be produced by anionic polymerization or by controlled radical polymerization methods, the latter being particularly well suited. Examples of such polyacrylates which are produced according to the RAFT process are described in U.S. Pat. No. 6,765,078 B2 and U.S. Pat. No. 6,720,399 B2. Also by means of N-oxcyles corresponding polyacrylates can be produces, as described, for example, in EP 1 311 555 B1. The atom transfer radical polymerization (ATRP) can also be used advantageously for the synthesis of narrowly distributed polyacrylates, preference being given to using monofunctional or difunctional secondary or tertiary hologenides as initiator and for abstraction of the halogenides(s) Cu, Ni, Fe, Pd, Pt, Ru, Os, Rh, Co, Ir, Ag or Au complexes are applied. The different possibilities of ATRP are described in the documents U.S. Pat. Nos. 5,945,491 A, 5,854,364 A and 5,789,487 A.

The monomers for producing the polyacrylates preferably contain proportionate functional groups which are suitable for entering into linking reactions with epoxide groups. This advantageously allows a thermal cross-linking of the polyacrylates by reaction with epoxides. Linking reactions are to be understood as meaning, in particular, addition and substitution reactions. It leads therefore preferably to a linkage of the building blocks carrying the functional groups with building block carrying epoxy groups, in particular in the sense of a cross-linking of the polymer building blocks carrying the functional groups via cross-linking agent molecules carrying epoxy groups as linking bridges. The epoxide-group-containing substances are preferably multifunctional epoxides, i.e. those having at least two epoxide groups; accordingly, preference is given overall to an indirect linking of the building blocks carrying the functional groups.

The polyacrylate or the polyacrylates are preferably cross-linked by linking reactions—in particular in the sense of addition or substitution reactions—of functional groups contained in them with thermal cross-linking agents. All thermal cross-linking agents can be used which lead to a rapid post-cross-linking of the polymer to the desired degree of cross-linking at lower temperatures than the processing temperature, in particular at room temperature. For example, it is possible to use a combination of carboxyl, amine and/or hydroxy groups—containing polymers and isocyanates as cross-linking agents, in particular the aliphatic or amine-deactivated trimerized isocyanates described in EP 1 791 922 A1.

Suitable isocyanates are especially trimerized derivatives of MDI [4,4-methylene-di(phenyl isocyanate)], HDI [hexamethylene diisocyanate, 1,6-hexylene diisocyanate] and/or IPDI [isophorone diisocyanate, 5-isocyanato-1-isocyanatomethyl-1,3,3-trimethylcyclohexane], for example the types Desmodur® N3600 and XP2410 (in each case BAYER AG: aliphatic polyisocyanates, low-viscosity HDI trimerisates). Also suitable is the surface-deactivated dispersion of micronized trimerized IPDI BUEJ 339®, now HF9® (BAYER AG).

In principle, for cross-linking are also suitable other isocyanates like Desmodur VL 50 (polyisocyanate on MDI base, Bayer AG), Basonat F200WD (aliphatic polyisocyanate, BASF AG), Basonat HW100 (water-emulsifiable polyisfunctional isocyanate based on HDI, BASF AG), Basonat HA 300 (allophanate-modified polyisocyanate on isocyanurate, HDI-based, BASF) or Bayhydur VPLS2150/1 (hydrophilic modified IPDI, Bayer AG).

The thermal cross-linker, for example isocyanate, is preferably used as from 0.1 to 5% by weight, in particular from 0.2 to 1% by weight, based on the total quantity of the polymer to be cross-linked.

The thermal cross-linker preferably comprises at least one substance containing epoxide groups. The epoxide group-containing substances are, in particular, multifunctional epoxides, i.e. those having at least two epoxide groups; accordingly, there is an overall indirect linkage of the building blocks carrying the functional groups. The epoxide group-containing substances can be both aromatic and aliphatic compounds.

Highly suitable multifunctional epoxides are oligomers of epichlorohydrin, epoxy ethers of polyhydric alcohols (especially ethylene, propylene and butylene glycols, polyglycols, thiodiglycols, glycerin, pentaerythritol, sorbitol, polyvinyl alcohol, polyallylalcohol and the like), epoxyethers of polyhydric phenols [especially resorcinol, hydroquinone, bis-(4-hydroxyphenyl)-methane, bis-(4-hydroxy-3-methylphenyl)-methane, bis (4-hydroxy-3,5-dibromophenyl)-methane, bis (4-hydroxy-3,5-difluorophenyl)-methane, 1,1-bis (4-hydroxyphenyl)ethane, 2,2-bis (4-hydroxyphenyl)propane, 2,2-bis (4-hydroxy-3-methylphenyl)-propane, 2,2-bis-(4-hydroxy-3-chlorophenyl)-propane, 2,2-bis-(4-hydroxy-3,5-dichlorophenyl)-propane, 2,2-bis (4-hydroxy-3,5-dichlorophenyl) propane, bis-(4-hydroxyphenyl) phenyl methane, bis-(4-hydroxyphenyl) phenyl methane, bis-(4-hydroxyphenyl) diphenyl methane, bis-(4-hydroxyphenyl)-4'-methylphenylmethane, 1,1-bis-4-hydroxyphenyl)-2,2,2-trichloroethane, bis-(4-hydroxy-phenyl)-(4-chlorophenyl)-methane, 1,1-bis-(4-hydroxyphenyl)-cyclohexane, bis-(4-hydroxyphenyl)-cyclohexylmethan, 4,4'-dihydroxydiphenyl, 2,2'-dihydroxydiphenyl, 4,4'-dihydroxydiphenylsulfone)) and their hydroxyl ether, phenol-formaldehyde condensation products, such as phenol alcohols, phenol-aldehyde resins and similar S- and N-containing epoxides (for example N,N-diglydylanilin, N,N'-dimethyldiglycidy]-4,4-diaminodiphenylmethane) and also epoxides which, according to the common processes, have been produced of polyunsaturated carboxylic acids or monounsaturated carboxylic acid radicals of unsaturated alcohols, glycidyl esters, polyglycidyl esters, which can be obtained by polymerization or mixed polymerization of glycidyl esters of unsaturated acids or are available from other acidic compounds (cyanuric acid, diglycidyl sulfide, cyclic trimethylene-trisulfone or their derivatives and others).

Very suitable ethers are, for example, 1,4-butanediol diglycidyl ether, polyglycerol-3-glycidyl ether, cyclohexanedimethanol diglycidyl ether, glycerol triglycidyl ether, neopentyl glycol diglycidyl ether, pentaerythritol tetraglycidyl ether, 1,6-hexanediol diglycidyl ether), polypropylene glycol diglycidyl ether, trimethylolpropane triglycidyl ether, pentaerythritol tetraglycidyl ether, bisphenol-A-diglycidyl ether and bisphenol-F-diglycidyl ether.

The use of a cross-linker-accelerator system ("cross-linking system") described, for example, in EP 1 978 069 A1 is particularly preferred in order to obtain better control over the processing time, cross-linking kinetics and the degree of cross-linking. The cross-linker-accelerator system comprises at least one substance containing epoxide groups as cross-linker and at least one substance accelerating at a temperature below the melting temperature of the polymer to be cross-linked for cross-linking reactions by means of compounds containing epoxide groups as accelerator.

As accelerators are preferably used amines (formally to be considered as substitution products of ammonias; in the following formulas these substituents are depicted by "R" and comprise in particular alkyl and/or aryl radicals and/or other organic radicals) especially preferred those amines which with the building block of the polymers to be cross-linked enter into no or only minor reactions.

In principle, both primary ($NRH_2$), secondary ($NR_2H$) as well as tertiary amines ($NR_3$) can be chosen as accelerators, of course also those which have a plurality of primary and/or secondary and/or tertiary amine groups. However, particularly preferred accelerators are tertiary amines such as, for example, triethylamine, triethylenediamine, benzyldimethylamine, dimethylamino-methylphenol, 2,4,6-tris-(N,N-dimethylaminomethyl)-phenol, N,N'-bis(3-dimethyl-amino) propyl) urea. Advantageously, multifunctional amines such as diamines, triamines and/or tetramines can also be used as accelerators. For example, diethylenetriamine, triethylenetetramine, trimethylhexamethylenediamine are outstandingly suitable.

In addition, amino alcohols are preferably used as accelerators. Particular preference is given to using secondary and/or tertiary aminoalcohols, whereat in the case of a plurality of amine functionalities per molecule, preferably at least one, preferably all, of the amine functionalities are secondary and/or tertiary. As preferred amino alcohol accelerators can be applied triethanolamine, N,N-Bis(2-hydroxypropyl) ethanolamine, N-methyldiethanolamine, N-ethyldiethanolamine, 2-aminocyclohexanol, Bis(2-hydroxycyclohexyl) methylamine, 2-(diisopropylamino) ethanol, 2-(dibutylamino) ethanol, N-butyldiethanolamine, N-butylethanolamine, 2-[(Bis(2-hydroxyethyl) amino)]-2-(hydroxymethyl)-1,3-propanediol, 1[bis(2-hydroxyethyl) amino]-2-propanol, triisopropanolamine, 2-(dimethylamino)ethanol, 2-(diethylamino) ethanol, 2-(2-dimethylaminoethoxy)ethanol, N,N,N'-trimethyl-N'-hydroxyethyl bisaminoethyl ether, N,N,N'-trimethylaminoethylethanolamine and/or N,N,N'-trimethylaminopropylethanolamine.

Other suitable accelerators are pyridine, imidazoles (such as 2-methylimidazole) and 1,8-diazabicyclo[5.4.0] and ec-7-ene. Cycloaliphatic polyamines can also be used as accelerators. Also suitable are phosphate-based accelerators such as phosphines and/or phosphonium compounds, for example triphenylphosphine or tetraphenylphosphonium tetraphenylborate.

Furthermore, it can be provided that a per se adhesive polymer foam with a polymer basis consisting of polyacrylate(s) is coated on the top and/or bottom side with a pressure-sensitive adhesive mass, whereat the polymer basis of this pressure-sensitive adhesive consists as well preferably of polyacrylates. Alternatively, other or otherwise pretreated adhesive layers, i.e. for example pressure-sensitive adhesive layers and/or heat-activatable layers based on polymers other than poly(meth)acrylates, can be laminated to the foamed layer. Suitable base polymers are natural rubbers, synthetic rubbers, acrylate block copolymers, vinylaromatic block copolymers, in particular styrene block copolymers, EVA, polyolefins, polyurethanes, polyvinyl ethers and silicones. Preferably, these layers do not contain noteworthy proportions of migratable constituents which are so well compatible with the material of the foamed layer that they diffuse in significant quantity in the foamed layer and alter the properties there.

Generally, the soft phase of the adhesive tape may contain at least one tackifying resin.

Under the term "Tackifier Resin", the expert understands a resin-based substance that increases the stickiness.

As adhesive resins in the case of the self-adhesive mass, in particular hydrogenated and unhydrogenated hydrocarbon resins and polyterpene resins can be used for example as main component.

Preferably suitable are amongst others hydrogenated polymerisates of dicyclopentadiene (for example Escorez 5300 series, Exxon Chemicals), hydrogenated polymerisates of preferably $C_8$ and $C_9$ aromates (for example Regalite and Regalrez series, Eastman Inc., or Arkon P serie, Arakawa). These can flow away by hydrogenation of polymerisates of pure aromatic streams or by hydrogenation of polymerisates based on blends of different aromates. Suitable are also partly-hydrogenated polymerisates of $C_8$ and $C_9$ aromates (for example Regalite and Regalrez series, Eastman Inc. or Arkon M, Arakawa), hydrogenated polyterpene resins (for example Clearon N, Yasuhara), hydrogenated $C_5/C_9$ polymerisates (for example ECR-373, Exxon Chemicals), aromates-modified selectively hydrogenated dicyclopentadiene derivates (for example Escorez 5600 series, Exxon Chemicals). The above mentioned adhesive resins can be used alone as well as in a compound.

Other unhydrogenated hydrocarbon resins, non-hydrogenated analogs of the hydrogenated resins described above may also be used. Furthermore colophony-based resins (for example Foral, Foralyn) can be used.

The above mentioned colophony resins include for example natural colophony, polymerized colophony, partially hydrogenated colophony, fully hydrogenated colophony, esterified products of these types of colophony (such as glycerol esters, pentaerythritol esters, ethylene glycol esters and methyl esters) and colophony derivates (such as disproportionation colophony, fumaric acid modified colophony, and with lime modified colophony).

Adhesive resins preferred according to the invention are (partially) hydrogenated hydrocarbon resins based on $C_5$—, $C_5/C_9$ or $C_9$ as well as polyterpene resins on basis of α-pinene and/or β-pinene and/or δ-limonene as well as terpene-phenolic resins.

Especially preferred are terpene-phenolic resins, namely especially only terpene-phenolic resins without application of further types of resins.

To stabilize the pressure-sensitive adhesive masses usually are added primary antioxidants such as sterically hindered phenols, secondary antioxidants such as phosphite or thioether and/or C-radical scavenger.

For adjusting optical and adhesive properties, the pressure-sensitive adhesive masses may contain additives such as fillers, dyestuffs or anti-aging agents (antiozonants, light-stability agents, etc.).

As additives to the adhesive mass are typically used:
primary antioxidants such as sterically hindered phenols
secondary antioxidants such as phosphites or thioethers
light-stability agents such as UV-absorbers or sterically hindered amines The fillers can be reinforcing or non-reinforcing. Above all, mention should be made of silicon dioxides (spherical, specular or irregular, such as pyrogenic silicas), calcium carbonates, zinc oxides, titanium dioxides, aluminium oxides or aluminium oxide hydroxides.

The concentration of the additives influencing the optical and adhesive properties is preferably up to 20% by weight, further preferred up to 15% by weight.

The listed substances are not mandatorily, the adhesive mass also works without the addition of these, individually or in any combination, i.e. without fillers and/or anti-aging agents.

The soft phase of the adhesive tape can contain one or several additives. The additive(s) can occur in one or several layers of the soft phase.

Preferably, the soft phase comprises a polymer foam and the polymer foam contains partially or fully expanded microballoons, in particular, if the polymer basis of the polymer foam comprises one or several polyacrylate(s) and most preferred, if the polymer basis of the polymer foam consists of one or several polyacrylate(s). Microballoons are elastic hollow balls which have a thermoplastic polymer shell; they are therefore also referred to as expandable polymeric microballs or micro hollow balls. These balls are filled with low-boiling liquids or liquefied gas. In particular, polyacrylonitrile, pllyvinyldichloride (PVDC), polyvinyl chloride (PVC), polyamides or polyacrylates are used as shell material. As low-boiling liquid are suitable in particular lower alkanes, for example isobutane or isopentane, which are included as a liquefied gas under pressure in the polymer shell. By a physical action on the microballoons, for example, by a heat exposure—especially by heat supply or heat generation, caused for example by ultrasound or microwave radiation—softens on the one hand, the outer polymer shell, at the same time the liquid propellant in the shell turns in its gaseous state. At a certain pairing of pressure and temperature—also known as critical pairing—the microballoons expand irreversibly and expand three-dimensionally. The expansion is completed when the internal and the external pressure equalize. As the polymeric shell is preserved, this results in a closed-cell foam.

A variety of microballoon types are commercially available, such as Akzo Nobel's Expancel DU-types (dry unexpanded), which differentiate themselves essentially by their size (6 to 45 μm unexpanded diameter) and their starting temperature needed for expansion (75 to 220° C.). Furthermore, unexpanded types of microballoons can also be obtained as an aqueous dispersion having a solids proportion or microballoon proportion of about 40 to 45% by weight, moreover also as polymer-bound microballoons (masterbatches), for example in ethylvinyl acetate having a microballoon concentration of about 65% by weight. Furthermore, so-called microballoon slurry systems are available at which the microballoons with a solids content of 60 to 80% by weight are available as aqueous dispersion. The microballoon dispersions as well as the microballoon slurrys and the masterbachtes, are, like the DU types, suitable for foaming a polymer foam contained in the soft phase of the adhesive tape.

Particularly preferably is when the polymer foam contains microballoons which have in non-expanded condition at 25° C. a diameter of from 3 µm to 40 µm, in particular from 5 µm to 20 µm, and/or, after expansion, a diameter of from 10 µm to 200 µm, in particular from 15 µm to 90 µm.

Preferably, the polymer foam contains up to 30% by weight micorballoons, especially between 0.5% by weight and 10% by weight, each related to the total mass of the polymer foam.

The polymer foam in the soft phase of the adhesive tape—as far as this comprises a polymer foam—is preferably characterized by the widespread absence of open-cell cavities. Particularly, the polymer foam preferably has as proportion of cavities without own polymer shell, that is to say of open-cell caverns, of not more than 2% by volume, in particular not more than 0.5% by volume. The polymer foam is thus preferably a closed-cell foam.

A pressure-sensitive adhesive mass containing expanded polymeric microballs may also contain partially incomplete or even unexpanded microballs. Rather, a distribution of different states of expansion occurs in the process. In the sense of the invention, expanded microballoons include fully or partially expanded microballoons. Unexpanded microballoons may additionally be present.

A polymer mass containing expandable hollow microballs may additionally contain non-expandable hollow microballs. It is only important that almost all gas-containing caverns are closed by a permanently sealed membrane, regardless of whether this membrane consists of an elastic and thermoplastic expandable polymer blend or of elastic and/or—in the range of temperatures that are possible in plastics processing—non-thermoplastic glass.

Also suitable for the pressure-sensitive adhesive mass are—independently selected from other additives—polymer solid balls such as PMMA balls, glass hollow balls, glass solid balls, phenolic resin balls, hollow ceramic balls, solid ceramic balls and/or solid carbon balls ("carbon micro balloons"), preferably the mentioned components are not contained in the pressure-sensitive adhesive mass.

The foamed pressure-sensitive adhesive mass constitutes a syntactic foam. In the case of a syntactic foam, the cavities are separated from each other and the substances (gas, air) in the cavities are separated from the surrounding matrix by a membrane. As a result, the material is much stronger than conventional foams with unreinforced gas inclusions.

Optionally, the soft phase of the adhesive type can also contain powdery and/or granular fillers, dyestuffs and pigments, in particular also abrasive and reinforcing fillers such as chalks ($CaCO_3$), titanium dioxide, zinc oxides and carbon black also to high proportions, i.e. from 0.1 to 50% by weight, related to the total mass of the soft phase.

Furthermore, in the soft phase can be contained flame-retardant fillers such as ammonium polyphosphate, electrical conductive fillers such as conductive carbon black, carbon fibers and/or silver-coated balls, thermal conductive materials such as boron nitride, aluminium oxide, silicon carbide, ferromagnetic additives such as iron-(III)-oxides, further additives for increasing the volume such as blowing agents, glass solid balls, glass hollow balls, carbonized micro-balls, phenolic micro-balls, micro-balls of other materials, silicic acid, silicates, organic renewable raw materials such as wood flour, organic and/or inorganic nanoparticles, fibers, anti-aging agents, light-stability agents, antiozonants and/or compounding agents. Anti-aging agents which can be used preferably are primary, for example 4-methoxyphenol or Irganox® 1076, and also secondary anti-aging agents, for example Irgafos® TNPP or Irgafos® 168 from BASF, if appropriate also in combination with one another. As further anti-aging agents phenothiazine (C radical scavenger) and hydroquinone methyl ether can be used in the presence of oxygen as well as oxygen itself.

The thickness of the soft phase amounts preferably to 200 to 1800 µm, especially preferred 300 to 1500 µm, most especially 400 to 1000 µm. The thickness of the soft phase is determined according to ISO 1923.

The compound of hard and soft phase or also of the intended layers in the hard and/or soft phase among each other to the adhesive tape can be done for example by lamination or co-extrusion. It is possible that the hard and the soft phase are connected directly with one another.

It is likewise possible for one or more adhesion-enhancing layer(s) to be arranged between the hard phase and the soft phase. The adhesive tape may also contain additional layers.

Preferably, at least one of the layers to be bonded together, more preferred are several of the layers to be joined, and most preferably all of the layers to be joined are pretreated with corona (with air or nitrogen), plasma (air, nitrogen or reactive gases or reactive compounds applicable as aerosol) or flame pretreatment methods.

On the back side, that is to say on the side of the hard phase which is turned away from the substrate, a functional layer is preferably applied which has, for example, separating properties or UV-stabilizing properties. This functional layer consists preferably of a film having a thickness of ≤20 µm, especially preferred of ≤10 µm, in particular preferred of ≤8 µm, for example of ≤5 µm or a lacquer having a thickness of ≤10 µm, especially preferred of ≤6 µm, in particular preferred of ≤3 µm, for example of ≤1.5 µm. The film, as well as the lacquer, contain preferably a UV-absorber, and/or the polymer base of the film or of the lacquer contains UV-absorbing and/or UV-repellent groups.

Films can be applied to the back side of the hard phase by laminating or co-extrusion. The film is preferably a metallized film. The polymer base of the film is preferably selected from the group consisting of polyarylenes, polyvinyl chlorides (PVC), polyethylene terephthalates (PET), polyurethanes, polyolefins, polybutylene terephthalates (PBT), polycarbonates, polymethylmethacrylates (PMMA), polyvinylbutyralene (PVB), ionomers and mixtures of two or more of the polymers listed above. "Main constituent" here means "constituent with the largest proportion by weight, based on the total weight of the film". With the exception of polyarylenes, all the materials for the film listed above preferably have a high content of UV stabilizers.

In a specific embodiment, the adhesive tape in sequence directed to the substrate consists of a functional layer (as described above), a hard phase and a soft phase consisting of a pressure-sensitive adhesive layer, a polymeric foam, the polymer base of which consists of one or more polyolefins, and another pressure-sensitive adhesive layer. The lower pressure-sensitive adhesive layer may be covered with a release liner, but this is not counted as adhesive tape.

In a further specific embodiment, the adhesive type in sequence directed to the substrate consists of a functional layer (as described above), a hard phase and a pressure sensitive soft phase, the polymer base of which consists of one or more polyacrylates. Also at this embodiment, the lower side, i.e. the side facing the substrate, of the soft phase may be covered with a release liner, but this is not counted as adhesive tape.

The adhesive tapes are preferably foamed acrylate masses, in particular of the type described above, which may additionally have one (or more) intermediate carriers.

As a non-thermoplastic elastomer, the adhesive mass may contain rubber, in particular natural rubber. Furthermore, the adhesive mass can contain for example synthetic rubbers, such as synthetic rubbers from the group of the statistically copolymerized styrene-butadiene rubbers (SBR) and the butadiene rubbers (BR), synthetic polyisoprenes (IR), butyl rubbers (IIR), halogenated butyl rubbers (XIIR), polyacrylates, acrylate rubbers (ACM), polybutadienes (PB), ethylene-vinyl acetate copolymers (EVA) and polyurethanes and/or their blends individually or in any mixture with natural rubber.

The particularly preferred natural rubber or natural rubbers may in principle be selected from all available qualities, such as Crepe, RSS, ADS, TSR or CV types, depending on the level of purity and viscosity required.

To improve the processability, thermoplastic elastomers, such as, for example, synthetic rubbers with a proportion of up to 5% by weight, may preferably be added to the natural rubber.

As relevant examples one can mention here above all the particularly compatible styrene-isoprene-styrene (SIS) and styrene-butadiene-styrene (SBS) types.

The base polymer of the pressure-sensitive adhesive preferably consists of natural rubber, further preferred, in addition to natural rubber, no further elastomeric polymer is present in the pressure-sensitive adhesive.

In this case, the pressure-sensitive adhesive is a composition of natural rubber, one or more adhesive resin(s), preferably anti-aging agent(s) and expanded polymeric microballs, which is a preferred embodiment. Moreover, fillers and/or dyestuffs, which are explained later, may optionally be present in small amounts.

Preferably, the pressure-sensitive adhesive mass is used in adhesive tapes.

As adhesive tapes in the sense according to the invention are to be understood all on one or both sides with the adhesive mass coated flat or ribbon-shaped carrier structures, thus in addition to classical types also labels, coupons, punched pieces (punched flat carrier structures coated with adhesive mass), two-dimensionally extended structures (for example films) and the like, also multi-layer arrangements.

In addition, the term "adhesive tape" also includes so-called "transfer adhesive tapes", i.e. an adhesive tape without a carrier. In the case of a transfer adhesive tape, the adhesive mass is applied before application between flexible liners, which are provided with a release layer and/or have anti-adhesive properties. For application, one liner is usually removed first, then the adhesive mass is applied and then the second liner is removed.

A liner (release paper, release film) is not part of an adhesive tape or label, but only a tool for its production, storage or further processing by punching. Moreover, unlike an adhesive tape carrier, a liner is not firmly bonded to an adhesive layer.

In addition to the above mentioned transfer adhesive tapes, double-sided adhesive tapes are preferred in which the carrier, in particular the carrier film, is provided on both sides with the pressure-sensitive adhesive of the invention.

The adhesive tape can be made available in fixed lengths, for example by the meter or as an endless product on rolls (Archimedean spiral).

The carrier material used for the pressure-sensitive adhesive tape are the carrier materials, customary and common to the professional, such as paper, fabric, fleece or films of, for example, polyesters such as polyethylene terephthalate (PET), polyethylene, polypropylene, stretched polypropylene, polyvinyl chloride. Particular preference is given to carrier materials which are not or only very weakly extensible, such as BOPP and in particular PET.

The materials used for the film are polyester, in particular polyethylene terephthalate, polyamide, polyimide or mono- or biaxially stretched polypropylene. Also possible is the use of multilayer laminates or co-extrudates. Preferably, the film is single-layered.

In order to achieve very good results for the roughening, it is recommended to use as a reagent for etching the film trichloroacetic acid ($CI_3C$—COOH) or trichloroacetic acid in combination with inert crystalline compounds, preferred silicon compounds, particularly preferably ($SiO_2$).

The purpose of the inert crystalline compounds is to be incorporated into the surface of the PET film in order to increase the roughness and surface energy.

The thickness of the film according to a preferred embodiment is between 5 and 250 µm, preferably between 6 and 120 µm, in particular between 12 and 100 µm, very particularly between 12 and 50 µm.

Preferably, the film consists of polyethylene terephthalate and has a thickness between 12 and 50 µm.

The carrier films may also contain other additives such as UV protecting agents or halogen-free flame retardants.

For the production of the film, it may be appropriate to add additives and other components that improve the film-forming properties, reduce the tendency to form crystalline segments and/or improve or even worsen the mechanical properties in a targeted manner.

The carrier material may be equipped on one side or preferably on both sides with the pressure-sensitive adhesive mass of the invention. In the case of the adhesive tape provided on both sides with the pressure-sensitive adhesive mass of the invention, at least one layer forms the pressure-sensitive adhesive mass of the invention.

The pressure-sensitive adhesive tape is formed by partially or completely applying the adhesive mass on the carrier. The coating can also take place in the form of one or more stripes in longitudinal direction (machine direction), optionally in the cross direction, but in particular it is over the entire surface. Furthermore, the adhesive mass can be applied screen-dot-shaped by screen printing, whereat the adhesive dots can be also be of different sizes and/or can be distributed differently, by gravure printing in longitudinal and cross direction contiguous webs, by screen printing or by flexo printing. The adhesive mass may be in calotte form (produced by screen printing) or in another pattern such as grids, stripes zigzag lines. Furthermore, it can also be sprayed on, for example, which results in a more or less irregular application pattern.

It is advantageous to use a bonding agent, a so-called primer layer, between the carrier and the adhesive mass or a physical pretreatment of the carrier surface to improve the adhesion of the adhesive mass on the carrier.

As primer, the known dispersion and solvent systems can be used for example based on isoprene- or butadiene-containing rubber, acrylate rubber, polyvinyl, polyvinylidene and/or cyclo-rubber. Isocyanate or epoxy resins as additives improve the adhesion and increase partly the shear strength of the pressure-sensitive adhesive. Bonding agents can also be applied by means of a co-extrusion layer on one side of the carrier film. For example, flame impingement, corona or plasma or co-extrusion layers are suitable as physical surface treatments.

Furthermore, the carrier material (in the case of a tape being one-sided adhesive) can be subjected to an adhesive physical treatment or coating on the back or top side, i.e. opposite to the adhesive mass side, in particular equipped with a separating agent or release (optionally mixed with other polymers).

Examples are stearyl compounds (for example polyvinyl stearyl carbamate, stearyl compounds of transition metals such as Cr or Zr, ureas of polyethyleneimine and stearyl isocyanate or polysiloxanes.) The term stearyl is synonymous with all straight or branched alkyls or alkenyls having a c-number of at least 10 such as for example, octadecyl.

Suitable release agents further include surfactant release systems based on long-chain alkyl groups such as stearylsulfoscuccinate or stearylsulfosuccinamate, but also polymers which may be selected from the group consisting of polyvinylstearylcarbamaten such as Escoat 20 from Mayzo, polyethyleneimine stearylcarbamiden, chromium complexes of $C_{14}$ to $C_{28}$ fatty acids and stearyl copolymers, as described for example in DE 28 45 541 A. Also suitable are separating agents based on acrylic polymers with perfluorinated alkyl groups, silicones, for example based on poly(dimethylsiloxanes) or fluorosilicone compounds.

Furthermore, the carrier material can be pre- or post-treated. Common pretreatments are hydrophobic finishing, corona pretreatments such as $N_2$-corona or plasma pretreatments, common post-treatments are calendering, tempering, laminating, punching and covering.

The adhesive tape may also be laminated with a commercial release film or paper, usually of a base material of polyethylene, polypropylene, polyester or paper, coated on one or both sides with polysiloxane.

BRIEF DESCRIPTION OF THE DRAWINGS

Further details, objects, properties and advantages of the present invention will be explained in more detail by illustrative figures of the following divers, preferred execution examples.

DETAILED DESCRIPTION

Figure 1:
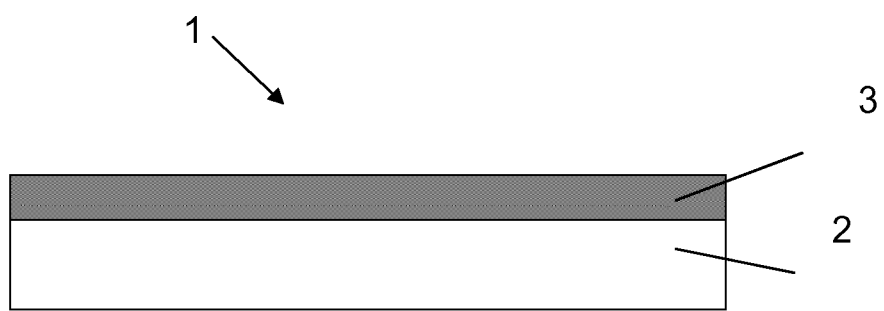
FIG. 1 shows a single-sided pressure-sensitive adhesive tape.

FIG. 1 shows a pressure-sensitive adhesive tape 1 which is adhesive on one side. The pressure-sensitive adhesive tape 1 has an adhesive layer 2, which has been produced by coating of the previously described pressure-sensitive adhesive mass on a carrier 3.

In addition (not shown) may still be provided a release film, which covers and protects the adhesive layer 2 prior to the use of the pressure-sensitive adhesive tape 1. The release film is then removed from the adhesive layer 2 prior to use.

Figure 2:
FIG. 2 shows a double-sided pressure-sensitive adhesive tape.

The product structure shown in FIG. 2 shows a pressure-sensitive adhesive tape 1 with a carrier 3, which is coated on both sides with a pressure-sensitive adhesive mass and thus has two adhesive layers 2.

Also in this embodiment, at least one adhesive layer 2 is preferably covered with a release film. In the case of a rolled-up adhesive tape, this one release film may also cover the second adhesive layer 2 if necessary. But also several separating films can be provided.

Furthermore, it is possible that the carrier film is provided with one or more coatings. Furthermore, only one side of the pressure-sensitive adhesive tape may be provided with the pressure-sensitive adhesive mass according to the invention and on the other side another pressure-sensitive adhesive mass may be used.

Figure 3:
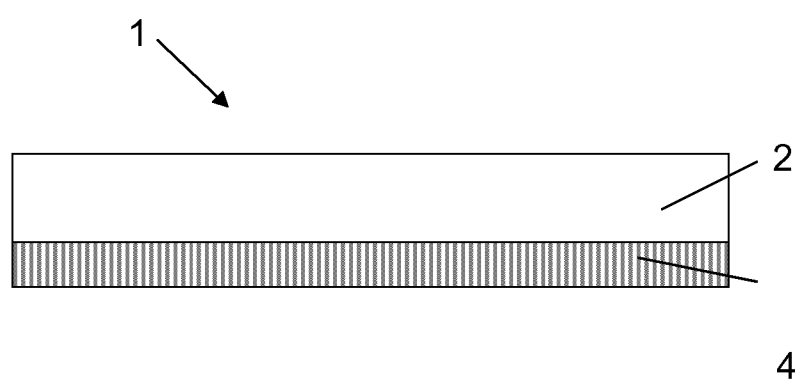
FIG. 3 shows a carrier-free pressure-sensitive adhesive tape (transfer adhesive tape).
Figure 4:
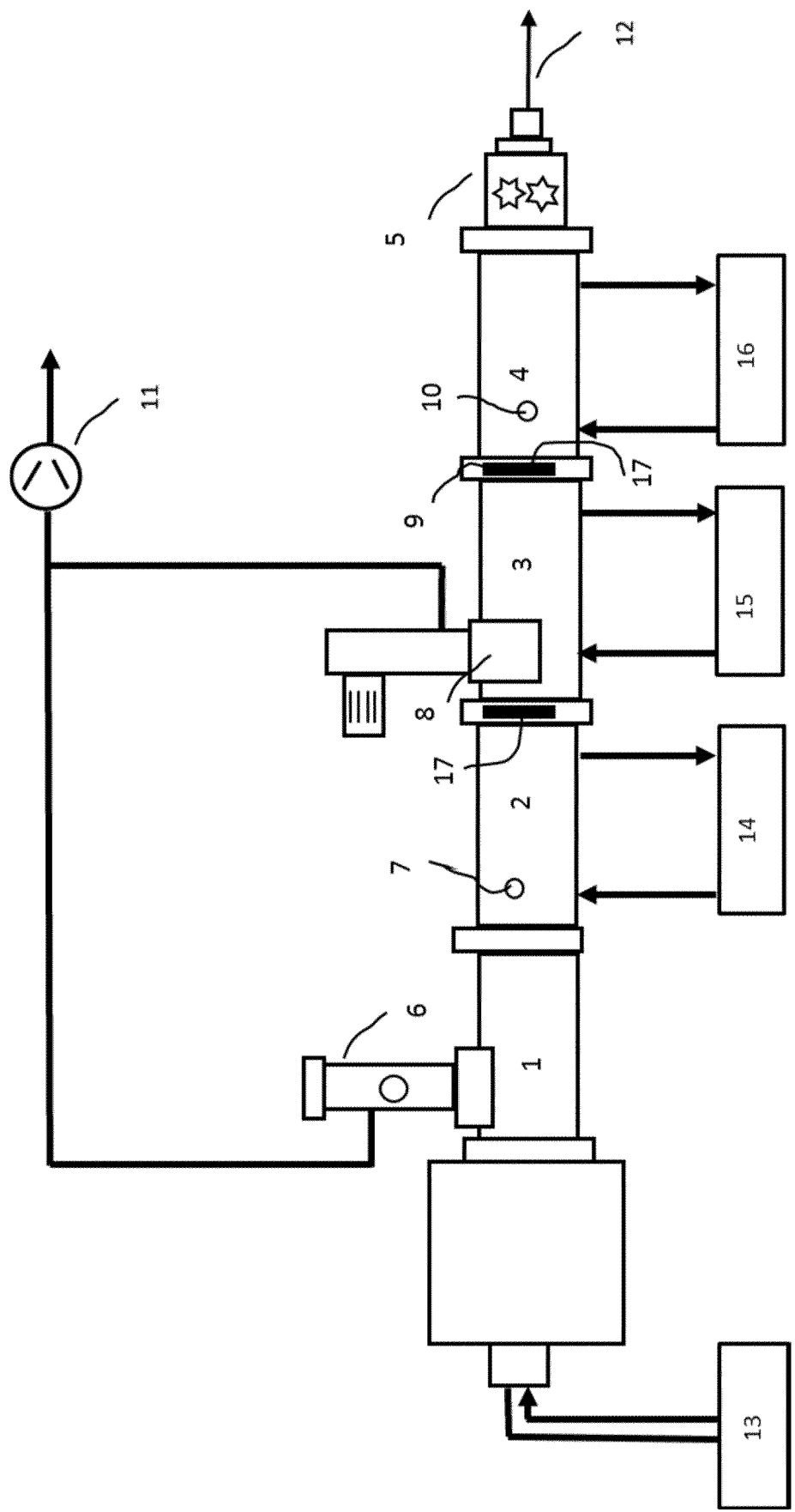
FIG. 4 shows a planetary roller extruder.

The product structure shown in FIG. 3 shows a pressure-sensitive adhesive tape 1 in the form of a transfer adhesive tape, i.e. a carrier-free pressure-sensitive adhesive tape 1. For this purpose, the pressure-sensitive adhesive mass is coated on one side on a release film 4, thus forming a pressure-sensitive adhesive layer 2.

Optionally, this pressure-sensitive adhesive layer 2 is still covered on its second side with another release film. To use the pressure-sensitive adhesive tape, the release films are removed then.

As an alternative to release films, for example, release papers or the like can be used. In this case, however, the surface roughness of the release paper should be reduced in order to achieve the smoothest possible side of the pressure-sensitive adhesive mass.

LIST FOR REFERENCE SIGNS

1) Feed part with single-screw
2) Cylinder assembly 1
3) Cylinder assembly 2
4) Cylinder assembly 3
5) Melt pump for product discharge
6) Back venting vacuum degassing via feed part
7) Feed opening for the plasticized polymers
8) Opening in the cylinder assembly for vacuum degassing with product holding-down device
9) Feed opening in the intermediate ring for liquids
10) Feed opening in the cylinder assembly for liquids
11) Vacuum pump
12) Product discharge
13) Heating-cooling circuit for central spindle
14) Heating-cooling circuit for cylinder assembly 1
15) Heating-cooling circuit for cylinder assembly 2
16) Heating-cooling circuit for cylinder assembly 3
17) Intermediate ring

The invention claimed is:

1. A method for producing thermally cross-linkable polymers in a planetary roller extruder, wherein:
  a) the planetary roller extruder has
     a feed part and
     a compounding part, the compounding part being formed by a cylinder assembly area which comprises at least two coupled cylinder assemblies, planetary spindles of which are driven by a single common central spindle,
  b) the polymers are supplied into the planetary roller extruder in a plasticized state,
  c) the plasticized polymers are fed into a first cylinder assembly of the at least two coupled cylinder assemblies, within a first half of the first cylinder assembly,
  d) the feed part of the planetary roller extruder is charged with vacuum,
  e) in case the cylinder assembly area is formed by two cylinder assemblies, a shell of a second cylinder assembly of the at least two coupled cylinder assemblies has an opening via which air and possibly other volatile components are degassed from the plasticized polymers by a vacuum or
     in case the cylinder assembly area is formed by more than two cylinder assemblies, a shell of the second cylinder assembly of the more than two cylinder assemblies or a shell of a downstream cylinder assembly has an opening via which air and possibly other volatile components are degassed from the plasticized polymers by a vacuum, f) pre-flow temperatures of the central spindle and the at least two coupled cylinder assemblies are adjusted so that the polymers to be degassed remain in the plasticized state, g) one or more liquids are added to the plasticized polymers in the second cylinder assembly or in the downstream cylinder assembly or in an intermediate ring between two cylinder assemblies downstream of the opening via which air and possibly other volatile components are degassed, h) a blend of the plasticized polymers and the liquids in the cylinder assembly area, in which the liquids are incorporated into the plasticized polymers, are cooled so that, after the discharge of the blend from the planetary roller extruder, no evaporation takes place of the liquids mixed in the plasticized polymers, i) a length of the cylinder assembly area in which degassing of the plasticized polymers by vacuum takes place is between more than 50% and 80% of a length of the entire cylinder assembly area, j) the blend of the plasticized polymers and the liquids is supplied to a coating unit without further additional treatment.

2. The method according to claim 1, wherein at least one additional opening is provided in a shell of the first cylinder assembly, via which air and optionally further volatile components are degassed from the plasticized polymers by vacuum.

3. The method according to claim 1, wherein the charging the feed part with vacuum is effected by applying a pressure of less than 50 mbar at an outlet at the feed part or at a shell opening of the first cylinder assembly.

4. The method according to claim 1, wherein the opening in the shell of the second cylinder assembly is equipped with a product holding-down device, which prevents a discharge of the plasticized polymers from the planetary roller extruder, the product holding-down device being an intermeshing twin-screw pair, via free flanks of which the air and optionally the further volatile components are drawn-off of the plasticized polymers under the influence of heat and vacuum.

5. The method according to claim 1, wherein the adding of the liquids into the plasticized polymers takes place in an intermediate ring which is located between the second and a third cylinder assembly and which has at least one radial boring for feeding the liquids.

6. The method according to claim 1, wherein the adding of the liquids into the planetary roller extruder takes place via one or more borings in the shell of a cylinder assembly, the borings being in a region within the first half of the cylinder assembly.

7. The method according to claim 1, wherein the plasticized polymers are fed into the planetary roller extruder through an opening in a wall of the shell of the first cylinder assembly or via an intermediate ring which is located between the feed part and the first cylinder assembly and which has at least one radial boring for feeding the plasticized polymers.

8. The method according to claim 1, wherein the plasticized polymers are fed into the planetary roller extruder by a melt pump, by a single- or multi-screw extruder, or by a barrel or tank melt unit.

9. The method according to claim 1, wherein the discharge of the blend from the planetary roller extruder takes place by a melt pump coupled at an end of the cylinder assembly area.

10. The method according to claim 1, wherein the coating unit is a calendar or a die through which the blend is applied on a carrier material.

11. The method according to claim 1, wherein the plasticized polymers are from the group consisting of non-thermoplastic elastomers, thermoplastic synthetic rubbers, polyacrylates, polyurethanes, polyepoxides, and mixtures in any proportions thereof.

12. The method according to claim 1, wherein the plasticized polymers are blended with at least one of tackifying resins, fillers, softeners, oils, thixotropic agents and further additives.

13. The method according to claim 1, wherein the mixture coming from the planetary roller extruder is a pressure-sensitive self-adhesive or a thermosetting structural adhesive mass.

\* \* \* \* \*